United States Patent
Barrera et al.

(10) Patent No.: US 10,219,505 B2
(45) Date of Patent: *Mar. 5, 2019

(54) METHODS AND APPARATUS FOR SURVEILLANCE AND CONTROL OF INSECT VECTORS

(71) Applicant: The United States of America, as represented by the Secretary, Department of Health and Human Services, Washington, DC (US)

(72) Inventors: Roberto Barrera, Guaynabo, PR (US); Andrew J. Mackay, San Juan, PR (US); Manuel Amador, Guaynabo, PR (US)

(73) Assignee: The United States of America, as Represented by the Secretary, Department of Health and Human Services, Washington, DC (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/965,230

(22) Filed: Dec. 10, 2015

(65) Prior Publication Data

US 2016/0128313 A1    May 12, 2016
US 2017/0367312 A2    Dec. 28, 2017

Related U.S. Application Data

(62) Division of application No. 13/822,598, filed as application No. PCT/US2012/025462 on Feb. 16, 2012, now Pat. No. 9,237,741.
(Continued)

(51) Int. Cl.
*A01M 1/10* (2006.01)
*A01M 1/14* (2006.01)
(Continued)

(52) U.S. Cl.
CPC .............. *A01M 1/026* (2013.01); *A01M 1/00* (2013.01); *A01M 1/02* (2013.01); *A01M 1/04* (2013.01);
(Continued)

(58) Field of Classification Search
CPC ............ A01M 1/00; A01M 1/02; A01M 1/06; A01M 1/10; A01M 1/106; A01M 1/14
(Continued)

(56) References Cited

U.S. PATENT DOCUMENTS 584,378 A * 6/1897 Lewis .............................. 43/107
1,787,421 A * 12/1930 Ruddell .................. A01M 1/02
43/107

(Continued)

FOREIGN PATENT DOCUMENTS

DE         3316045 A1 * 11/1984 .............. A01M 1/14
DE   102008008241 A1 *  8/2009 ............ A01M 1/106
(Continued)

OTHER PUBLICATIONS

Translation of JP2007-236359.*
(Continued)

*Primary Examiner* — Darren W Ark
(74) *Attorney, Agent, or Firm* — Polsinelli PC; Ron Galant

(57) ABSTRACT

Improved devices for the capture, detection, or quantification of insect vectors such as gravid female insects, are provided. The devices include surface coloration, design, and dimension that improved their ability to attract and/or capture target insect vectors. The traps are used in process for detection or control of insect vectors in indoor and outdoor environments.

11 Claims, 15 Drawing Sheets

Related U.S. Application Data

(60) Provisional application No. 61/443,588, filed on Feb. 16, 2011.

(51) Int. Cl.
*A01M 1/02* (2006.01)
*A01M 1/04* (2006.01)
*A01M 1/00* (2006.01)

(52) U.S. Cl.
CPC ............. *A01M 1/10* (2013.01); *A01M 1/106* (2013.01); *A01M 1/14* (2013.01)

(58) Field of Classification Search
USPC ................................ 43/107, 132.1, 114, 122
See application file for complete search history.

(56) References Cited

U.S. PATENT DOCUMENTS

| | | | | |
|---|---|---|---|---|
| 3,997,999 | A * | 12/1976 | Evans | A01M 1/02 43/107 |
| 4,019,459 | A * | 4/1977 | Neff | A01K 61/00 119/223 |
| 4,328,636 | A * | 5/1982 | Johnson | A01K 39/0106 119/51.04 |
| 5,123,201 | A * | 6/1992 | Reiter | A01M 1/026 43/107 |
| 5,172,514 | A * | 12/1992 | Weber | A01M 1/02 43/124 |
| 5,389,518 | A | 2/1995 | Steele et al. | |
| 5,501,033 | A * | 3/1996 | Wefler | A01M 1/2016 43/131 |
| 5,737,870 | A * | 4/1998 | Thind | A01M 1/026 43/107 |
| 5,896,697 | A * | 4/1999 | Kang | A01M 1/02 43/107 |
| 6,265,229 | B1 | 7/2001 | Fodstad et al. | |
| 6,389,740 | B2 * | 5/2002 | Perich | A01M 1/04 424/409 |
| 6,990,768 | B1 * | 1/2006 | Boston | A01M 1/02 119/69.5 |
| 7,073,287 | B2 * | 7/2006 | Lau | A01M 1/02 43/107 |
| 7,134,238 | B2 * | 11/2006 | Forehand | A01M 1/106 43/107 |
| 7,434,351 | B2 * | 10/2008 | Bette | A01M 1/106 43/107 |
| 7,694,455 | B1 * | 4/2010 | Bowden | A01M 1/106 43/107 |
| 7,774,976 | B2 * | 8/2010 | Geier | A01M 1/02 43/113 |
| 7,946,077 | B2 | 5/2011 | Fukuhara | |
| 7,988,984 | B2 * | 8/2011 | Hockaday | A01M 1/02 119/654 |
| 8,109,035 | B2 * | 2/2012 | Bowden | A01M 1/106 43/107 |
| 8,181,384 | B2 * | 5/2012 | Lebost | A01M 1/14 43/107 |
| RE44,543 | E * | 10/2013 | Rojas | A01N 25/006 424/84 |
| 8,940,287 | B2 * | 1/2015 | Birmingham | A01N 65/00 424/84 |
| 9,237,741 | B2 * | 1/2016 | Barrera | A01M 1/026 |
| 9,554,567 | B2 * | 1/2017 | Koehler | A01M 1/2005 |
| 2003/0113812 | A1 | 6/2003 | Hemperly | |
| 2004/0216366 | A1 * | 11/2004 | Ritchie | A01M 1/026 43/114 |
| 2005/0279016 | A1 * | 12/2005 | Williams | A01M 1/10 43/122 |
| 2005/0287601 | A1 | 12/2005 | Hageman et al. | |
| 2006/0016120 | A1 * | 1/2006 | Masters | A01M 1/023 43/114 |
| 2006/0090391 | A1 * | 5/2006 | Huang | A01M 1/106 43/107 |
| 2006/0248782 | A1 * | 11/2006 | Dancy | A01M 1/106 43/107 |
| 2007/0039236 | A1 * | 2/2007 | Geier | A01M 1/02 43/139 |
| 2007/0134814 | A1 | 6/2007 | Kajander et al. | |
| 2010/0229458 | A1 | 9/2010 | Bowden et al. | |
| 2012/0110892 | A1 * | 5/2012 | Lloyd | A01M 1/02 43/107 |
| 2015/0020438 | A1 * | 1/2015 | Work | A01M 1/14 43/114 |
| 2017/0000101 | A1 * | 1/2017 | Gaugler | A01M 1/165 |

FOREIGN PATENT DOCUMENTS

| | | | | |
|---|---|---|---|---|
| FR | 2910238 | A1 * | 6/2008 | ............ A01M 1/106 |
| GB | 2410668 | A * | 8/2005 | ............ A01M 1/02 |
| JP | 01273534 | A * | 11/1989 | |
| JP | H01273534 | A | 11/1989 | |
| JP | 10146145 | A * | 6/1998 | |
| JP | H10146145 | A | 6/1998 | |
| JP | 2005087199 | A * | 4/2005 | |
| JP | 2006223276 | A * | 8/2006 | |
| JP | 2007236359 | A * | 9/2007 | |
| JP | 2007236359 | | 10/2007 | |
| JP | 2012039992 | A * | 3/2012 | ............ A01M 1/106 |
| WO | WO-2006126235 | A1 * | 11/2006 | ............ A01M 1/145 |
| WO | WO-2009146520 | | 6/2009 | |
| WO | WO-2009146520 | A2 * | 12/2009 | ............ A01M 1/02 |
| WO | WO-2010041342 | A1 * | 4/2010 | ............ A01M 1/106 |
| WO | WO-2012061064 | A1 * | 5/2012 | ............ A01M 1/02 |
| WO | WO-2014084709 | A1 * | 6/2014 | ............ A01M 1/106 |

OTHER PUBLICATIONS

Jacobson, M., "Natural Insect Attractants and Repellents, New Tools in Pest Control," In Natural Pest Control Agents; Crosby, D.; Advances in Chemistry, vol. 53, American Chemical Society: Washington, DC (1966).

Reiter, P. et al., "Enhancement of the CDC Ovitrap With Hay Infusions for Daily Monitoring of Aedes Aegypti Populations," J Am Mosq Control Assoc, 1991: 7:52-55.

* cited by examiner

METHODS AND APPARATUS FOR SURVEILLANCE AND CONTROL OF INSECT VECTORS

CROSS REFERENCE TO RELATED APPLICATIONS

This application is a divisional of U.S. patent application Ser. No. 13/822,598, which is a U.S. National Phase of PCT/US12/25462 filed Feb. 16, 2012 and which depends from and claims priority to U.S. Provisional Application No. 61/443,588 filed Feb. 16, 2011, the entire contents of each of which are incorporated herein by reference.

GOVERNMENT INTEREST

The invention described herein may be manufactured, used, and licensed by or for the United States Government.

FIELD

The invention relates to control of insect disease vectors. More specifically, the application relates to control of mosquitoes that serve as the primary vector for the transmission of dengue viruses, Chikungunya and other arbo-viruses.

BACKGROUND

Vector control is currently the only available method for reducing the transmission of dengue viruses. Approaches to diminishing the capacity of a mosquito population to support the transmission of dengue viruses include: (i) reducing their overall density (i.e. there are fewer mosquitoes available to transmit the virus), and (ii) reducing their average lifespan (i.e. mosquitoes less likely to live long enough to acquire and transmit the virus).

Several types of autocidal gravid ovitraps (i.e. sticky ovitraps and lethal ovitraps) have been developed as vector surveillance and control tools for *Aedes* (*Stegoinyia*) mosquitoes. These devices kill or capture gravid mosquitoes entering the trap and prevent their progeny from completing development.

To be a practical vector control tool, an autocidal gravid ovitrap (AGO) must be effective, inexpensive, and should not require frequent maintenance. Traps that utilize pesticides may contribute to the development of insecticide resistance, are less likely to be acceptable to homeowners due to potential health or environmental concerns, and risk becoming productive larval development sites if the insecticide fails to prevent preimaginal development of the vector. Other potential limitations of AGOs that have been previously reported include poor competition with existing containers, and a significant rate of failure due to loss of the aqueous attractant.

As such, there is a critical need to identify alternative tools and strategies for effective, cost-effective control and surveillance of adult vectors.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A vector trap is provided that has improved functionality for the detection and quantification of insect vectors, optionally gravid female insect vectors, in an environmental area. A vector trap includes an attractant chamber with an interior volume optionally of 19 liters or more and a lid. A capture chamber transects the lid and forms a trap entrance at a first end and a screen barrier at a lower end where the capture chamber is positioned within at least part of the attractant chamber. An egg collection substrate including a hydrogel is associated with the attractant chamber at the lower end of the capture chamber. The vector traps of this configuration are optionally superior for collection of gravid female vectors, for vector control, and quantification of vectors in an environmental area, and are termed autocidal gravid ovitraps.

Other aspects of a vector trap include an attractant chamber terminating in a trap entrance. In these aspects, an attractant chamber serves as a capture chamber such that no separate capture chamber is used. Such aspects are optionally used as passive adult vector traps, optionally for interior use. The capture chamber has a capture substrate coating at least a portion of the interior volume of the capture chamber. An egg collection substrate is housed within the capture chamber, optionally coating the bottom surface of the capture chamber. An olfactory bait is optionally included housed within the capture chamber.

In each of the aspects of a vector trap, the color of one or more elements of the trap is dark in shade, optionally black. The trap entrance optionally has a linear dimension of 10 cm or more, optionally 10 to 26 cm. An attractant in the form of a hay infusion or other attractant is optionally included in one or more locations within a trap.

Processes of monitoring, detecting, or controlling a vector in an environmental area are provided whereby a vector trap of the invention is placed within an environmental area and is used to capture vectors to detect their presence and quantity.

DETAILED DESCRIPTION

Figure 1:
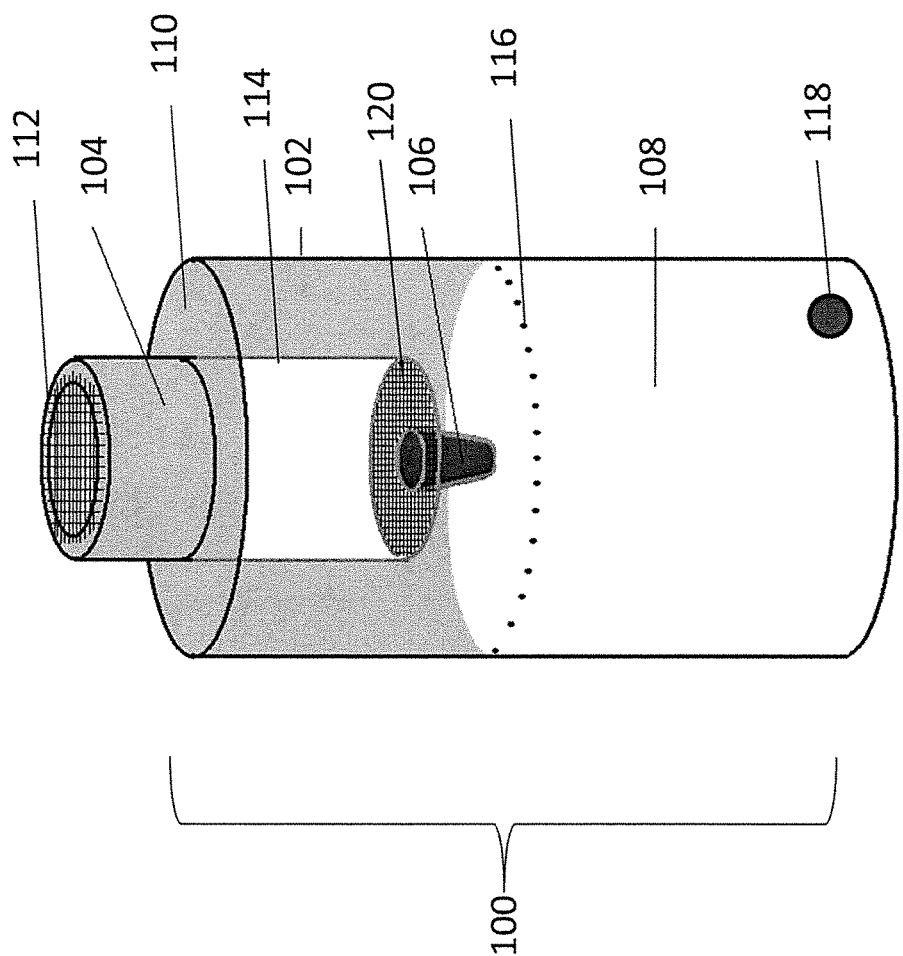
FIG. 1 is an illustration of one aspect of a vector trap with superior efficacy as an autocidal gravid ovitrap.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the process is described as an order of individual steps or using specific materials, it is appreciated that described steps or materials may be interchangeable such that the description of the invention includes multiple parts or steps arranged in many ways as is readily appreciated by one of skill in the art.

The invention has utility as a system or device for the control or sampling of an insect population. Vector traps are provided that require much less frequent maintenance, are superior in attracting gravid insects and preventing progeny from captured gravid insects from maturing and leaving the trap relative to traps previously used. The vector traps of the invention are also superior in the ease of use and lack of complexity, each leading to use in inexpensive vector control.

Autocidal gravid ovitraps (i.e. lethal ovitraps and sticky ovitraps) are devices that specifically target older female mosquitoes that have already blood fed on a human at least once and are looking for a suitable place to lay their eggs. Adult mosquitoes that enter the trap are killed by contact with either an insecticide-treated or an adhesive-coated surface. By eliminating older female mosquitoes and their progeny, gravid ovitraps can potentially reduce both the density and the average lifespan of adult females in a mosquito population. The autocidal vector traps of the present invention have certain attributes that distinguish them from prior devices including: (i) size: optionally at 45 cm tall with a capacity of optionally 10 or more liters of attractant (optionally, water+decaying vegetation), which is substantially larger ($\approx$5-20×) than other vector trap models developed for commercial or academic use. This allows the autocidal gravid ovitrap (AGO-trap) to compete more vigorously with other aquatic habitats to attract mosquitoes (more visible, greater odor) and the attractant is much less likely to dry up between service visits; (ii) safety: the AGO-traps do not contain insecticides or other potentially harmful materials. The adults are captured by a nontoxic adhesive and eggs are collected on a hydrogel that mimics the natural substrates where gravid females prefer to deposit their eggs; (iii) reliability: lethal ovitraps rely on an insecticide to kill visiting adult mosquitoes and to prevent the development of viable offspring from any eggs laid in the trap. The effectiveness of these insecticides can be rapidly lost when exposed to harsh environmental conditions that degrade the insecticide, or if the mosquito population is able to develop resistance to the insecticide, enabling mosquitoes to use the trap as a habitat for producing new mosquitoes. The AGO-traps of the invention are designed so that the risk of the device serving as a source of new adult mosquitoes is extremely low. Eggs are laid on a synthetic polymer (hydrogel) rather than on or near the surface of a liquid (as in other vector trap devices). Although eggs laid on the hydrogel may hatch, the resulting mosquito larvae are unable to complete development.

One aspect of an inventive vector trap in a configuration as an autocidal gravid ovitrap is illustrated in FIG. 1. A vector trap 100 includes an attractant chamber 102 having an interior volume of at least 10 liters and a lid 110. A lid is removably associated with a body of the attractant chamber 102. Within the lid 110, a hole or opening is cut to receive a capture chamber 104 that is placed such that it contacts and traverses the thickness of the lid 110 and extends into the interior region of the attractant chamber 102. A sealant material of those commonly known in the art is optionally used to seal any space between the lid 110 and the capture chamber 104. A retainer device is optionally used to hold the capture chamber in place. A retainer device is any device suitable to maintain the position of the capture chamber during normal operation of the vector trap. An illustrative example is an adjustable circular clamp. A capture chamber 104 has a first end that serves as a trap entrance 112, and a lower end. The first end is at least partially open such that an insect or particle of desired size can traverse a screen associated with the first end proximal or associated with the trap entrance 112. A lower end optionally includes a second screen that may allow insect eggs to pass through, but has a screen size too small for an adult mosquito to pass through. A capture chamber 104 has an inner surface 114 that is optionally coated with a capture substrate. In some aspects, a capture substrate coats a capture sheet, optionally formed of vinyl or other plastic material that is placed within the capture chamber. As such, a capture substrate is optionally present on an inner surface 114, a capture sheet, or combinations thereof. A capture substrate is optionally an adhesive. A capture substrate is optionally free of an insecticide. Illustrative examples of adhesive include non-setting adhesives such as polybutylene adhesives, among others known in the art. An inner surface 114 is optionally continuously coated with a capture substrate or is intermittently coated such that some surface area of the inner surface 114 is optionally free from adhesive. In some aspects, an inner surface 114 is not coated with a capture substrate, whereby the capture substrate is otherwise suspended or placed in an attractant chamber. A lower end of a capture chamber is optionally partially or fully traversed by a screen 120. The screen 120 has holes that are sufficiently small that eggs may pass through to the infusion reservoir 108 below, and such that odors from the infusion reservoir 108 can pass through the screen, but that mature or maturing insects are unable to cross. At least a portion of the screen 120 is traversed by or otherwise occupied by an egg collection substrate 106 that is optionally coating the screen barrier 120 or traverses the screen barrier and is housed by a container. An egg collection substrate 106 is optionally formed of a hydrogel material. Any of numerous hydrogel types known in the art are suitable for use in an egg collection substrate. In one aspect, a hydrogel is a polyacrylamide co-polymer (PAM). Other suitable hydrogel materials are known to one of skill in the art.

The attractant chamber 102 forms an infusion reservoir 108 that houses an attractant material. An infusion reservoir 108 is optionally dimensioned such that it will hold 3 liters or more of attractant material, optionally 3 to 15 liters, optionally 5-10 liters, optionally 9.3 liters. The volume of attractant material is one superior aspect of the invention. A long need has been felt for an AGO that does not require frequent maintenance. The inventors discovered that increasing the volume of attractant material provides for greater lifetime of trap effectiveness relative to other trap types and sizes. An attractant material is optionally an aqueous material that includes decaying matter 118 as a component. Decaying matter is optionally plant material. In some aspects, decaying material is hay. An attractant material is optionally infused with plant matter that is already in a state of decay or begins to decay after being placed in aqueous environment. The wall(s) of an attractant chamber 102 optionally include one or more, optionally a plurality, of drainage passages 116 that traverse the wall of the attractant chamber 102. The drainage passages 116 serve to allow attractant material to drain from the attractant chamber 102 if the volume increases beyond a desired threshold such as by rainfall entering the attractant chamber 102. A drain passage 116 is of any suitable dimension to allow fluid to pass through. Illustratively, a drain passage has a diameter of 0.1 to 3 millimeters or any value or range therebetween, optionally 1-2 millimeters, optionally 1.2 millimeters.

Figure 2:
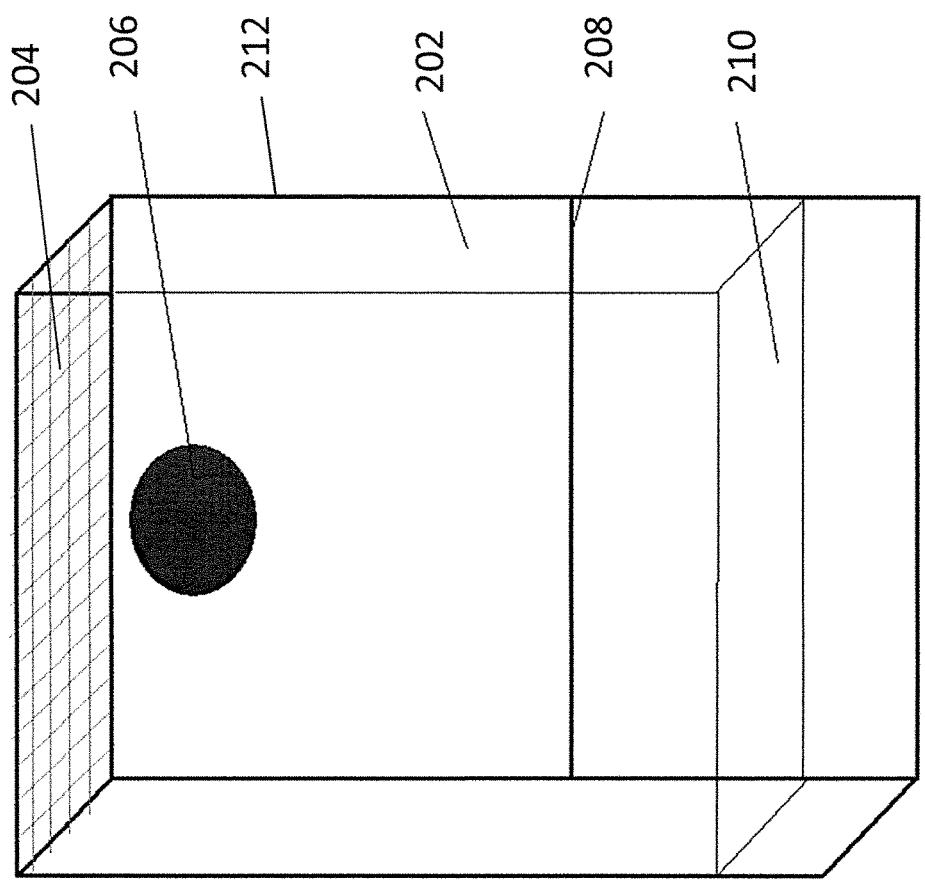
FIG. 2 is an illustration of another aspect of a vector trap having superior efficacy as a passive adult trap.

The home environment is an important location for targeting Ae. aegypti adults in different physiological states, both for the purposes of control and surveillance. Previously available tools for sampling adult vectors in the home are costly, laborious, or are unsuitable for providing long-term, continuous collections. FIG. 2 illustrates a second aspect of a vector trap with particular efficacy for use in an enclosed environmental area such as within a building, home, or a room therein. As such, such aspects are optionally used in processes within an enclosed environmental area. The aspect illustrated in FIG. 2 is optionally termed a passive adult trap. A capture chamber 202 is used to define the outer dimensions of a trap. The dimensions of a capture chamber are optionally similar or identical to those listed in the aspect of FIG. 1. A capture chamber 202 is optionally cylindrical or other shape. The capture chamber 202 of FIG. 2 illustratively has a height of 15 to 50 cm in length or any value or range therebetween, optionally 20 to 40 cm, optionally 25-30 cm, optionally 28 cm in length. The capture chamber illustratively has a depth of 5-15 cm or any value or range therebetween, optionally 7 to 12 cm, optionally 10-12 cm. A capture chamber optionally has a width of 10 to 40 cm or any value or range therebetween, optionally 15-30 cm, optionally 20-30 cm. The aspect depicted in FIG. 2 has a height of 27.9 cm, a depth of 11.4 cm, and a width of 25.4 cm. It is appreciated that any suitable dimension such that a capture chamber has dimensions to hold a volume of approximately 8 liters or greater, optionally 15 liters or greater, optionally 19 liters or greater, is optionally used. A capture substrate 212 is optionally coating the inner surface of the capture chamber 202, and is optionally formed from or includes an adhesive. The capture chamber 202 houses an egg collection substrate 210. The egg collection substrate 210 optionally is located at a bottom portion of a capture chamber 202. The egg collection substrate is optionally a hydrogel as otherwise indicated herein. A trap entrance 204 is illustratively located at a top surface of a capture chamber. The trap entrance 204 is optionally traversed by a screen of suitable dimension to allow insects or particles of desired size to traverse the screen and prevent unwanted insects or material from entering the trap. An olfactory bait 206 that includes an attractant is located within the capture chamber 202. The olfactory bait 206 is optionally suspended from the screen or other upper surface of a capture chamber 202, is attached to a capture substrate 212 which is coated onto the inner surface of a capture chamber, or is associated with the egg collection substrate 210. The olfactory bait optionally includes an attractant. A capture chamber 202 optionally includes a hinge 208 to allow access to the attractant chamber.

A trap entrance 112 is illustrated in FIG. 1 as a circular entrance. It is appreciated that other shapes are similarly operable such as a square or other polygon, or oval or other oblong type shape, or combinations thereof. FIG. 2 illustrates an optional aspect where a trap entrance 204 is rectangular, optionally a rectangular parallelepiped. The inventors discovered that the size of the trap entrance surprisingly significantly affects on the ability of the trap to capture female insects. A trap entrance 112, 204 is optionally circular and has a diameter from 9 cm to the size of the outer dimensions of an attractant chamber or capture chamber 102, 202. The area of a trap entrance is optionally from 63 $cm^2$ to the area defined by the attractant chamber or capture chamber 102, 202. Optionally, the area of a trap entrance is from 63 to 314 $cm^2$, optionally from 113 $cm^2$ to 201 $cm^2$, optionally 113 $cm^2$, optionally 201 cm $cm^2$. In some aspects, a linear cross sectional dimension of a trap entrance is from 12 to 16 cm, optionally 15.8 cm, optionally 12.0 cm.

Other vector traps commonly used either surfaces of more than one color or were of a relatively light color. The inventors discovered that AGOs with relatively dark colors such as dark browns, dark grays, dark greens, dark reds, or black are more effective than AGOs with a black-white contrast (provided by using a white lid). In some aspects, a capture chamber, lid, attractant chamber, or combinations thereof are optionally of relatively dark colors such as dark browns, dark grays, dark greens, dark reds, or black. In some aspects, a lid is black. Optionally, a capture chamber is black. Optionally, an attractant chamber is black. Optionally, a lid, capture chamber, and attractant chamber are black.

An egg collection substrate or olfactory bait is optionally permeated, interwoven with, or has dispersed within it or a portion of it, an attractant. An attractant is optionally any composition with known or unknown properties of attracting an insect, optionally specifically gravid female insects. Illustrative examples of an attractant include those that produce responses for mating, aggregation, or foraging, optionally those termed pheromones, and volatile constituents of plant or animal hosts that are attractive to insects searching for food or sites for oviposition. Illustrative examples include botanical materials (e.g. substances, extracts, etc.) would be more inclusive. An attractant optionally includes fruit extracts or purees. Specific examples include honey, nectar, and any attractant listed in Jacobson, M, Natural Insect Attractants and Repellents, New Tools in Pest Control in *Advances in Chemistry*, Vol. 53, 1966, American Chemical Society. Other attractants are similarly suitable. In some aspects, an attractant is a source of plant material that is in a state of decomposition or is capable of decomposing when placed in a capture chamber. An attractant is optionally hay, illustratively in the form of a hay infusion illustratively depicted at 118 of FIG. 1, but not limited as such. It is appreciated that more than one attractant is included in a vector trap such as a combination of attractants. Optionally, a capture chamber houses a volume of infusion material that includes an attractant of decaying plant material, as well as a second attractant housed within an attractant chamber or suspended within the capture chamber whereby the second attractant is a pheromone or volatile constituent of plant or animal sources.

A capture substrate optionally coats the entire inner surface of an attractant chamber, a capture chamber or both, or coats portions thereof. A capture substrate is optionally an adhesive. A capture substrate is optionally free of an insecticide. Illustrative examples of adhesive include non-setting adhesives such as polybutylene adhesives, among others known in the art.

Also provided are processes of monitoring or detecting the presence or absence of one or more insect vectors in an environmental area. As used herein a vector is an organism capable of housing, carrying, or transmitting a disease causing parasite. Illustratively, an example of a vector is an insect vector. A process optionally includes quantifying the relative number of insect vectors in an environmental area. A process includes placing a vector trap, optionally as described herein, in an environmental area and detecting the presence or absence of an insect vector in the environmental area. Detecting is achieved by maintaining the vector trap in the environmental area for a capture time, and determining if an insect vector is captured by the vector trap by observing the presence or absence of an insect vector on the capture substrate or egg capture substrate. The presence of an insect vector in the trap indicates the presence of the vector in the environmental area. The absence of an insect vector in the trap indicates the probable absence of an insect vector in the environmental area.

An environmental area is a defined area that may or may not house or include an insect vector. Illustratively, an environmental area is outside exposed to the environment, or inside a house or other building. Optionally, an AGO or of similar to the design of that illustrated in FIG. 1 is used in an outside environmental area. Optionally, a vector trap or of similar to the design of that illustrated in FIG. 2 is used in an inside environmental area. It is appreciated that a plurality of vector traps of the invention are optionally used in a single environmental area. Optionally, an environmental area is one acre, one building, or one room of a building. In some aspects, a plurality of vector traps is placed at a density within an environmental area. A density is optionally at or greater than two per acre, optionally 3, 4, 5, 6, 7, 8, 9, or 10 per acre. A density is optionally 1-2 per room. A density is optionally 1 to 5 per floor of a building, or any value or range therebetween. A density is optionally 1, 2, or 3 per 500 square feet of a single floor.

An advantage of the vector traps of the invention is that they do not require frequent servicing to maintain effectiveness. A process using an inventive vector trap optionally includes servicing a vector trap no more than once per 20 days, optionally no more than once per 1, 2, 3, 4, 5, 7, 8, 9, 10, 11, or 12 weeks.

A capture time is optionally 1, 2, 3, 4, 5, 7, 8, 9, 10, 11, 12, or more weeks. In some aspects, a capture time is optionally 62 days.

A process optionally includes quantifying the relative number of target vectors in an environmental area optionally includes determining the number of captured vectors after a capture time. The greater number of captured vectors equates to a greater number of vectors in an environmental area.

As used herein, a vector is an insect, optionally a female insect, optionally a female gravid insect. Illustrative examples of vectors include *Ae. aegypti, Ae. albopictus*, and *Culex quinquefasciatus* female mosquitoes.

Processes are also provided for reducing or eliminating the presence of a vector in an environmental area. A process includes placing one or more vector traps, optionally as described herein, in an environmental area and detecting the presence or absence of an insect vector in the environmental area following a capture time. Detecting is achieved by maintaining the vector trap in the environmental area for a capture time, and determining if an insect vector is captured by the vector trap by observing the presence or absence of an insect vector on the capture substrate or egg capture substrate. The presence of an insect vector in the trap indicates the presence of the vector in the environmental area. The absence of an insect vector in the trap indicates the probable absence of an insect vector in the environmental area. As a vector trap of the invention does not depend on insecticide to prevent hatching of eggs and elimination of trapped insects and their progeny, the vector traps themselves serve to decrease the number of or eliminate the presence of insects in an environmental area. The absence of a trapped vector in a vector trap after a capture time indicates the elimination of a vector from the environmental area.

Various aspects of the present invention are illustrated by the following non-limiting examples. The examples are for illustrative purposes and are not a limitation on any practice of the present invention. It will be understood that variations and modifications can be made without departing from the spirit and scope of the invention.

Example 1: Design of Autocidal Gravid Ovitraps for Use in Collection of Gravid Female Vectors A control vector trap useful as an autocidal gravid ovitrap (AGO) of preliminary design (AGO-A) is assembled including seven basic components: (i) a black, polyethylene pail serving as an attractant chamber (19 liter volume) (ii) white pail lid, (iii) a black plastic cup with the bottom removed (8.8 cm diameter at upper opening, 11 cm height) that serves as the trap entrance, (iv) a cylindrical capture chamber immediately below the trap entrance formed by a white, styrene cylinder (16 cm diameter); the inner surface coated with 155 $g/m^2$ of a non-setting, polybutylene adhesive (32UVR, Atlantic Paste & Glue Co., Inc., Brooklyn, N.Y.), (v) an autocidal oviposition substrate (egg capture substrate) (polyacrylamide co-polymer hydrogel; "PAM") at the base of the capture chamber, (vi) a reservoir (3.8 liter black, polyethylene bucket) for the infusion attractant immediately below the capture chamber, and (vii) a screen barrier preventing adult mosquitoes from moving between the capture chamber and the infusion reservoir formed in the attractant chamber. Drainage holes in the top of the bucket and bottom of the pail allowed excess infusion to drain from the trap (maximum infusion capacity 2.5 l).

A second trap for testing of improved autocidal gravid ovitrap design (AGO-B; FIG. 1) is constructed similar to the AGO-A, except for the following changes. The color of the lid is changed from white to black. To form the capture chamber, the 3.8 liter black, polyethylene bucket is inverted and raised so that it transects the pail lid. A 12.8 cm diameter hole is cut in the apex of the capture chamber to create the trap entrance. The color of the adhesive-coated surface lining the capture chamber is changed from white to black. The infusion attractant is added directly to the pail (capture chamber) to a volume of 9.3 liters. The trap entrance is covered by ¾" black polypropylene, oriented netting (Industrial Netting, Minneapolis, Minn.) to exclude the entry of larger debris or organisms.

A third autocidal gravid ovitrap (AGO-C) is identical to AGO-B with the exception that the diameter of the trap opening in the capture chamber is increased to 15.8 cm.

Example 2: Analyses of Operational Success of Trap Designs

The AGOs of Example 1 are baited with a 1:1 dilution of an anaerobically fermented (AF) hay infusion prepared in a closed container at a hay concentration 3.8 g per liter of water. For each trial, 61 grams of *Cynodon nleinfuensis* Vanderyst (Bogdan) is added to 16 liters of dechlorinated tap water in a sealed (19 liter capacity) plastic container. Infusions are aged for 7 days in a shaded location outdoors under ambient conditions, then sieved with a 1.2 mm mesh prior to use, and diluted with 1:1 with dechlorinated tap water. The diluted infusion added to the infusion reservoir to ≈80 percent of maximum capacity (AGO-A=2 L; AGO-B/C=8 L). The autocidal egg capture substrate (PAM) is prepared by hydrating Outdoor Variety Plant Gel crystals (DNB Designs, Inc., Colorado Springs, Colo.) with undiluted AF infusion (1 g/100 ml infusion) for a minimum of 3 hours prior to each experiment. All experiments are performed in a 10 m diameter filed cage with traps placed at 2-8 fixed locations within the cage with a minimum inter-trap distance of 2.6 to 4.8 meters. 120-150 gravid *Aedes aegypti* females are released from centre of cage and traps are collected following a 16-18 hour capture time.

In the first test, the effects of trap entrance diameter and the color of the capture surface on trap performance are examined. The numbers of gravid *Ae. aegypti* females captured in the AGO-A (8.8 cm diameter entrance+white capture surface) are compared with captures in three modified AGO-A designs; (i) 8.8 cm entrance+black capture surface (AGO-Am), (ii) 12.8 cm entrance+white capture surface, (iii) 12.8 cm entrance+back capture surface (AGO-B), (iv) 15.8 cm entrance+black capture surface (AGO-C). In each of 6 trials, two traps representing each treatment are randomly assigned to eight fixed locations in the field cage.

The second experiment assesses the combined effects of altering the shape of the trap entrance, the position of the capture surface of the capture chamber, and the size of the infusion reservoir (volume and surface area of infusion) on trap performance by comparing capture rates between the AGO-B (but with a white pail lid and without a ¾" exclusion screen) and the AGO-A design (iv) from the previous experiment. For each of three trials, four traps of each type are randomly distributed among 8 fixed locations in the field cage.

In the third experiment, the influence of color contrast between the trap entrance and the pail lid on the performance of the AGO-B is examined. Two AGO-Bs with a white lid, and two AGO-Bs with a black lid are randomly placed at 4 fixed locations in each of eight trials. The ¾" exclusion screen is not used in this test.

The fourth experiment is performed to test whether capture efficiency is reduced by the use of an exclusion screen to prevent larger organisms or debris (leaves, etc.) from entering the trap. In each of three trials, AGO-Bs are placed at eight fixed locations, and a ¾" exclusion screen is used to cover the trap entrance of four randomly selected traps.

Figure 3B:
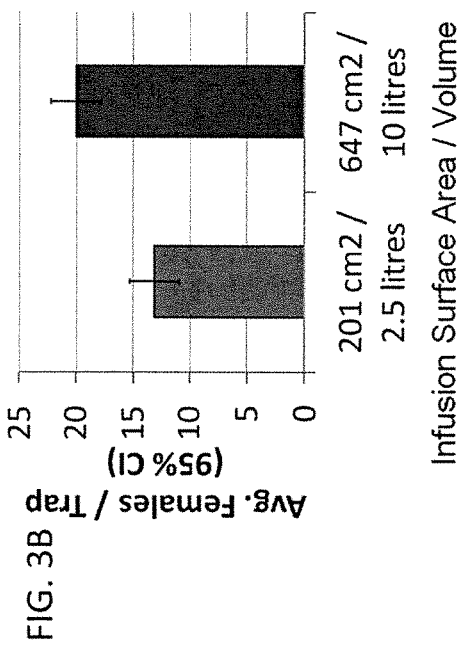
FIG. 3B illustrates the improved function of an AGO in a controlled environment with a larger volume of attractant in an infusion reservoir.
Figure 3D:
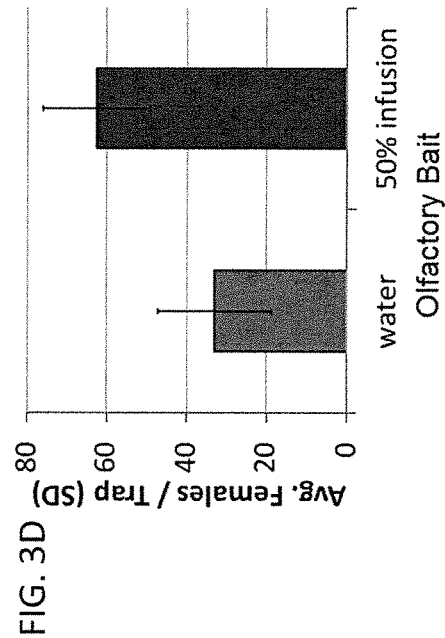
FIG. 3D illustrates the improved function of an AGO in a controlled environment with a presence of olfactory bait.
Figure 3A:
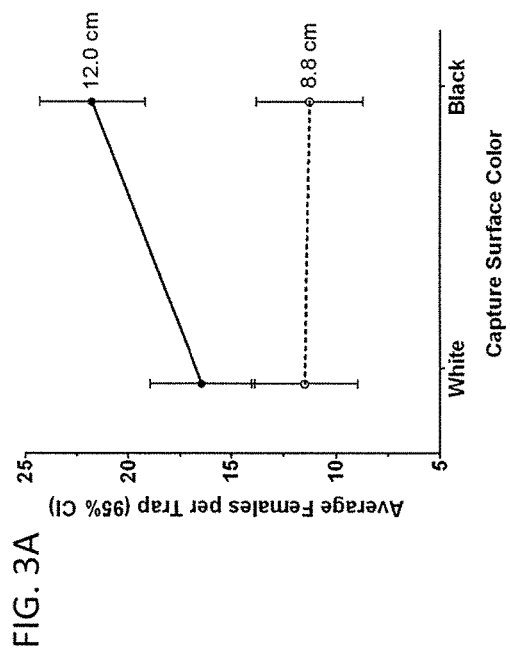
FIG. 3A illustrates the improved function of an AGO in a controlled environment with a larger trap entrance

Overall, greater numbers of females are captured in the AGO-B with the black capture surface and large trap opening (FIG. 3A). Similar improvements are observed using the AGO-C traps. The interaction between trap entrance diameter and surface color ($F=5.0$, $P=0.033$) has a significant influence on the numbers of adults captured. In the trap with the smaller aperture, no difference in efficacy is observed between traps with a white surface and traps with a black surface.

When the AGO-A design is compared with the AGO-B in competitive assays in the field cage, trap design is found to significantly influence capture efficiency ($F=21.0$, $P<0.001$) (FIG. 3B). Similar improvements are observed using the AGO-C traps. Mean (95% CI) numbers of females captured per trap in competitive assays in the field cage are 13.1 (10.9, 15.3) and 20.0 (17.8, 22.2) in the AGO-A and the AGO-B designs, respectively.

Figure 3C:
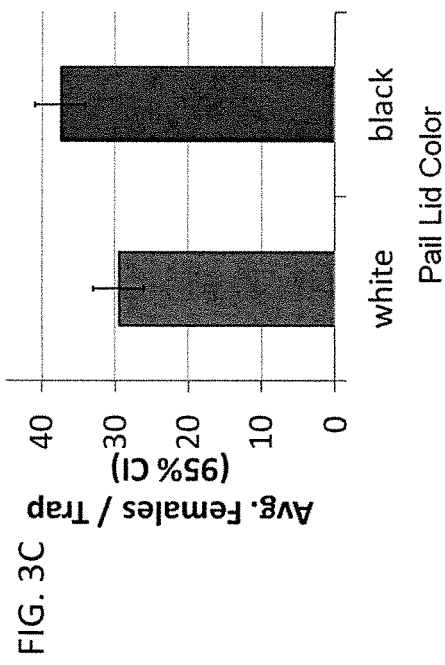
FIG. 3C illustrates the improved function of an AGO in a controlled environment with a darker shade of a trap lid.

Lid color has a significant influence on trap captures in the AGO-B ($F=11.3$, $P=0.002$) (FIG. 3C). The mean (95% CI) number of females captured in traps with a black lid is 37.4 (34.0, 40.9), compared with 29.5 (26.0, 32.9) in traps with a white lid.

In the field cage, the addition of a ¾" exclusion screen to the trap entrance has a significant positive effect on the capture of female *Ae. aegypti* in the AGO-B ($F=6.1$, $P=0.034$). Mean (95% CI) numbers of females captured in traps with and without an exclusion screen are 20.2 (17.7, 22.8) and 16.2 (13.7, 18.8), respectively.

Example 3: Attractiveness of a Hay Infusion Bait Produced In Situ

Two initial experiments are performed under semi-natural conditions to verify that the use of a "standard" AF infusion bait significantly enhances attraction to both AGO models of Example 1. In the first test, AGO-As are baited with either tap water or a 1:1 dilution of AF infusion. In each of five trials, four AGO-As representing each treatment group are randomly assigned to one of eight fixed locations in the field cage. This experiment is repeated in a smaller field cage (7.0×2.7×3.7 m) using the AGO-B. Eight replicate trials are performed in the second experiment.

In both trap designs (AGO-A, AGO-B), a 1:1 dilution of AF infusion bait results in a significantly greater number of females captured under semi-natural conditions (Table 1) (FIG. 3D).

After verifying that the "standard" AF infusion bait enhances the capture of gravid *Ae. aegypti* females in both trap designs, three sets of experiments are performed in Cage A to assess the attractiveness of a hay infusion fermented in situ by adding a 30 g packet of dry hay to the infusion reservoir filled to ≈80 percent of maximum capacity with dechlorinated tap water (8 liters). Hay packets are prepared by folding the dry hay into a compact form and wrapping it with a plastic cable tie.

In the first experiment, the relative attractiveness of infusion produced in situ using a hay packet in both the AGO-A and the AGO-B is compared with a standard 1:1 dilution of AF infusion. After aging for 7 days, each infusion is removed from its respective receptacle, sieved and 1.5 liters is transferred to a 3.8 liter plastic container that is placed inside an AGO-B (no additional water or infusion is added to the infusion reservoir). For each trial (n=6), an AGO-B representing each infusion type is randomly assigned to one of three fixed locations in the field cage.

Fermentation conditions of the infusion bait has a significant influence on attraction to the AGO-B (Table 2, Experiment 1); greater numbers of females were captured in traps baited with an infusion aged in a closed container (anaerobic), compared with traps where the infusion is aged in situ (Table 1) (FIG. 3D).

TABLE 1

| Trap Design | Attractant | Avg. females per trap (95% CI) | F | P-value |
|---|---|---|---|---|
| AGO-A | tap water | 7.5 (4.1, 10.9) | 22.8 | <0.001 |
|  | AF infusion | 18.8 (15.4, 22.2) |  |  |
| AGO-B | tap water | 33.0 (16.2, 49.8) | 9.4 | 0.022 |
|  | AF infusion | 62.6 (45.9, 79.4) |  |  |

The second test of an in situ infusion evaluates the influence of hay concentration on attraction to the AGO-B. Traps are baited with 8 liters of tap water and either 3.8 g or 8.3 g of hay per liter then aged under natural conditions in a shaded location. Assays are performed at 7 and 28 days, with three replicate trials performed at each time point. In each trial, four AGO-Bs with the low hay concentration, and four AGO-Bs with the high hay concentration are randomly assigned to one of the eight fixed locations in the field cage. The numbers of gravid females released per trial is reduced to 120 in the first time point (7 days).

TABLE 2

| Experiment | Infusion age (days) | Infusion Attractant | Avg. females per trap (95% CI) | F | P-value |
|---|---|---|---|---|---|
| 1—Infusion Fermentation conditions | 7 | AF | 46.1 (40.7, 51.6) | 5.1 | 0.034 |
|  |  | In situ in AGO-A | 37.4 (31.9, 42.8) |  |  |
|  |  | In situ in AGO-B | 36.3 (30.9, 41.7) |  |  |
| 2—Hay Concentration[1] | 7 | In situ (1x) | 12.1 (9.6, 14.6) | 0.8 | 0.392 |
|  |  | In situ (2.2x) | 10.1 (8.1, 13.1) |  |  |
|  | 28 | In situ (1x) | 19.4 (17.0, 21.7) | 3.8 | 0.066 |
|  |  | In situ (2.2x) | 16.2 (13.8, 18.6) |  |  |
| 3—Presence of con-specific larvae | 7 | In situ | 34.9 (29.1, 40.6) | 1.5 | 0.262 |
|  |  | In situ + 50 larvae | 39.7 (33.9, 45.4) |  |  |
|  |  | In situ + 500 larvae | 41.1 (35.4, 46.9) |  |  |

[1]1X infusion concentration = 3.8 g of hay per l of dechlorinated tap water, 2.2x infusion concentration = 8.3 g of hay per l of dechlorinated tap water.

The concentration of hay used to prepare in situ infusion did not significantly influence the number of females captured in the AGO-B (Table 2, Experiment 2).

In both the laboratory and field tests, gravid females will often expel their eggs when they are trapped on the adhesive surface of the AGO-A and AGO-B in a process known as death stress oviposition. Although some of these eggs adhere to the adhesive, others may fall into the infusion reservoir below and hatch. Also, eggs can be washed off the egg capture substrate into the infusion reservoir by rainfall. While the screen barrier between the capture chamber and the infusion reservoir prevents any adults produced in the reservoir from escaping, there is still a concern that odors released by con-specific larvae in the infusion might change the relative attractiveness of the trap. To investigate this, AGO-Bs baited with an in situ infusion (30 g hay packet) are aged under field conditions for 7 days in a shaded location. Five days prior to testing, 0, 50 or 500 first instar *Ae. aegypti* larvae are added to the infusion reservoir of each trap. For each trial (n=9), a single AGO-B representing each larval density is randomly assigned to one of three fixed locations.

The presence of conspecific larvae in the hay infusion did not significantly influence attraction to the AGO-B in the field cage (Table 2, Experiment 3).

Example 4: Field Assessments

Three consecutive field experiments evaluating the performance of the AGO-B of Example 1, and a modified AGO-B (termed AGO-C) with a trap opening of 15.8 cm with a black lid, black attractant chamber and black capture chamber, are performed in 2011 in the San Juan metropolitan area, Puerto Rico. The study site is a residential neighborhood ("El Comandante") ≈1.5 $km^2$ in size spanning two adjacent census tracts; urbanization Extension El Comandante and urbanization El Comandante. The thirty residential properties selected for trap placement are uniformly distributed with an average minimum distance of 145 m between properties. At each selected property, a pair of traps (1 trap per treatment) are placed at fixed positions that provide some protection from direct sunlight (i.e. next to the home or vegetation), and are at least 5 m apart, on opposite sides of the property when possible. Every Thursday and Monday, adult mosquitoes are removed from the adhesive surfaces and enumerated by species and sex, and the positions of the two treatments are rotated within each property. To facilitate consistent 3 day sampling intervals, the trap entrance is sealed with window screen from Thursday to Friday to prevent entry of mosquitoes. An additional measure of *Ae. aegypti* oviposition activity in the study area is provided by an 'enhanced ovicup pair' (Reiter et al. *J Am Mosq Control Assoc,* 1991; 7:52-55) placed at a home adjacent to each selected property. Ovicups are replaced at the start of each 3 day sampling period. Meteorological data is collected at the Luis-Muñoz International Airport, approximately 4 km from the study site (NCDC 2011).

In the first field experiment, numbers of adult mosquitoes captured in the initial trap model (AGO-A) and the improved devices (AGO-B; AGO-C) are compared over a continuous sampling period from 15 February to 18 April. Traps, constructed as described previously, are baited with a 30 g hay packet (in situ infusion) and distributed among the 30 selected properties. One property is later excluded from the experiment after home renovations prevented access to the traps. At the end of the 62 day study, the volume of infusion remaining in each trap is measured. Used capture surfaces from twelve randomly selected AGO-Bs and AGO-Cs are brought back to the laboratory to test whether their ability to capture gravid females diminished.

Figure 4A:
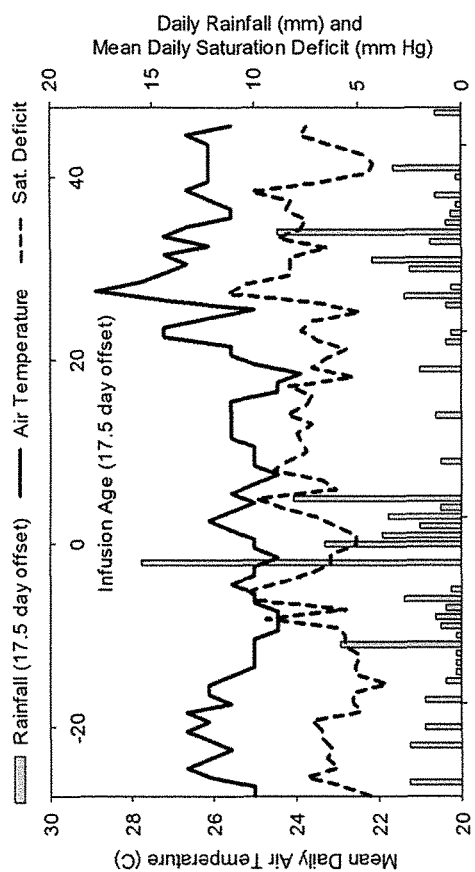
FIG. 4A illustrates improved function of an inventive ovitrap in a natural environment illustrating daily rainfall (17.5 days prior to sampling), average daily air temperature, average daily saturation deficit.
Figure 4B:
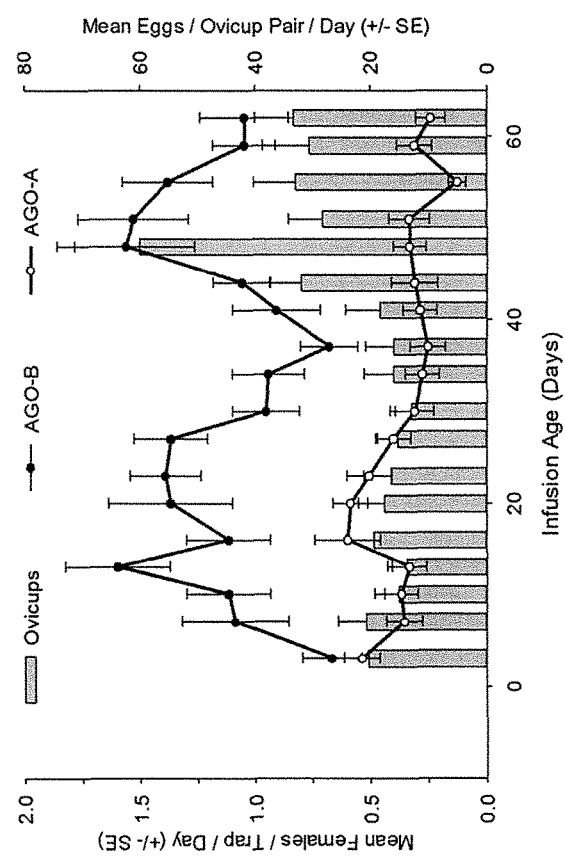
FIG. 4B illustrates improved function of an inventive ovitrap in a natural environment illustrating and the average numbers of *Aedes* eggs collected in enhanced ovicups and *Aedes aegypti* adult females collected in AGO-A and improved AGO-B autocidal gravid ovitraps.

In the first field experiment, the mean (±SE) numbers of adult *Ae. aegypti* females captured per trap per day are 1.16±0.05 in the improved device (AGO-B), and 0.36±0.02 in the AGO-A of Example 1. Higher numbers of *Ae. aegypti* females are captured in AGO-C traps. On average, the AGO-B collects 3.7-fold greater numbers of *Ae. aegypti* females than the AGO-A trap design (FIG. 4). The proportion of trap samples positive for *Ae. aegypti* adults is higher in the AGO-B (0.88), compared with the AGO-A (0.55) or the proportion of ovijar samples with eggs (0.63). At the conclusion of the experiment, the volume of infusion still remaining in AGO-B traps ranges from 5.5 to 9.0 liters (mean=74% of original volume). Cumulative rainfall and average daily air temperature recorded at the Luis-Muñoz International Airport (≈4 km from the study site) are 89.9 mm and 25.7° C., respectively (NCDC 2011). Based on the entrance diameter (12.8 cm), it is estimated that traps directly exposed to rainfall would have received about 1.1 liters of water over the study period. None of the traps are lost or damaged during the 62 day period.

The second field experiment (18 April to 12 May) is initiated immediately following the first experiment. The purpose is to assess whether restoration of attraction to the AGO-B or AGO-C after extended use requires a full replacement of the in situ infusion bait, or if it would be sufficient to replace the hay packet and the water lost via evaporation, but retain the fluid remaining in the infusion reservoir (partial replacement). Fresh traps (designated AGO-Bf and AGO-CO are prepared as described above to represent a "full bait replacement". The "partial bait replacement" condition is generated by replacing the adult capture surfaces, egg capture substrate, and hay packets in the AGO-B and AGO-C devices used in the first experiment (now designated AGO-Bp and AGO-Cp). Tap water is added to each AGO-Bp and AGO-Cp to bring the volume up to 9.3 liters.

Figures 5A, 5B:
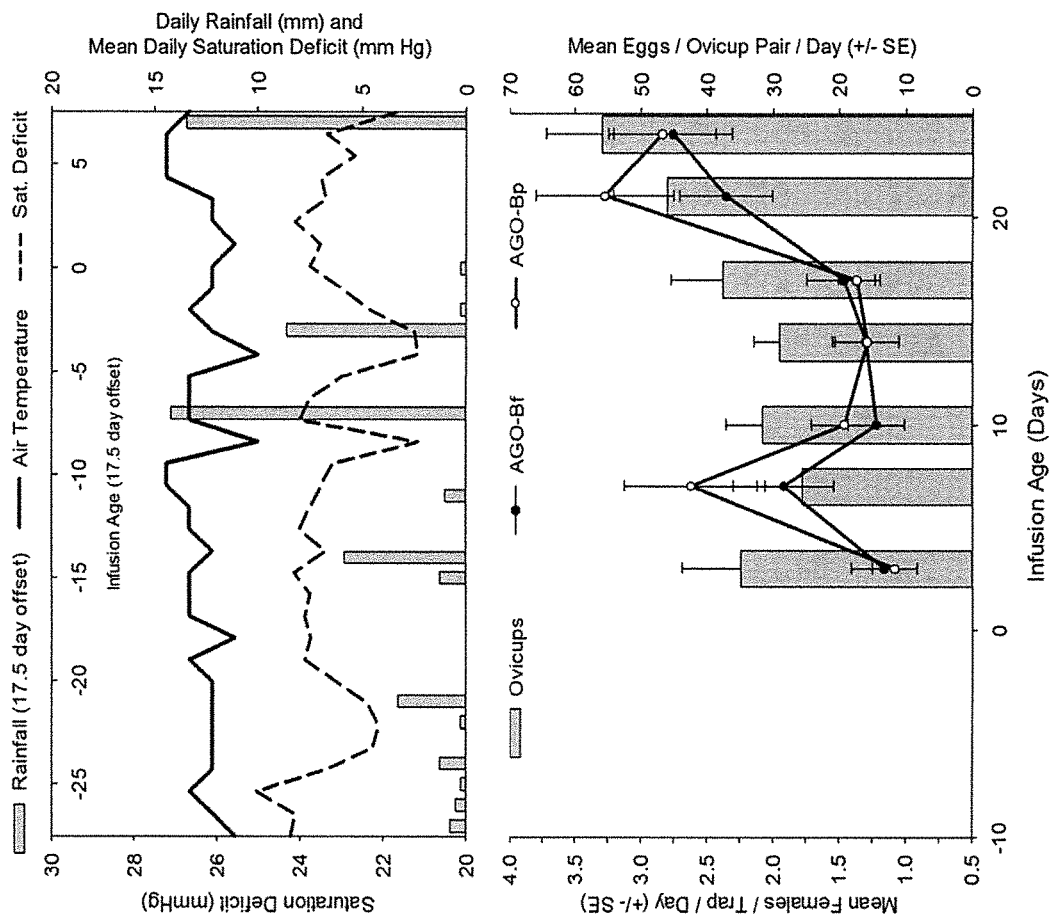
FIG. 5A illustrates improved function of an inventive ovitrap in a natural environment illustrating daily rainfall (17.5 days prior to sampling), average daily air temperature, average daily saturation deficit.
FIG. 5B illustrates improved function of an inventive ovitrap in a natural environment illustrating the average numbers of *Aedes* eggs collected in enhanced ovicups and *Aedes aegypti* adult females collected in an improved autocidal gravid ovitrap with a freshly prepared hay infusion bait (AGO-BO and an improved autocidal gravid ovitrap with hay infusion bait that was aged for 62 days, then partially replaced, prior to use (AGO-Bp)

In the second field experiment (FIG. 5), similar numbers of *Ae. aegypti* females are collected in freshly prepared traps (AGO-Bf) and in traps with a partial replacement of the infusion bait (AGO-Bp). The AGO-C traps collect similar numbers of numbers of *Ae. aegypti* females with total (AGO-Cf) or partial (AGO-Cp) replacement of infusion bait. These results indicate that the overall trap design provides excellent long term, low maintenance functionality.

Figure 6A:
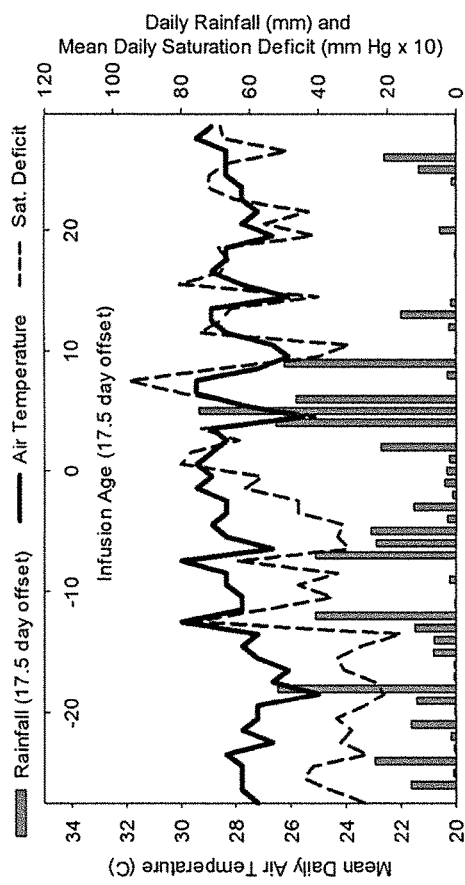
FIG. 6A illustrates improved function of an inventive ovitrap in a natural environment illustrating daily rainfall (17.5 days prior to sampling), average daily air temperature, average daily saturation deficit.
Figure 6B:
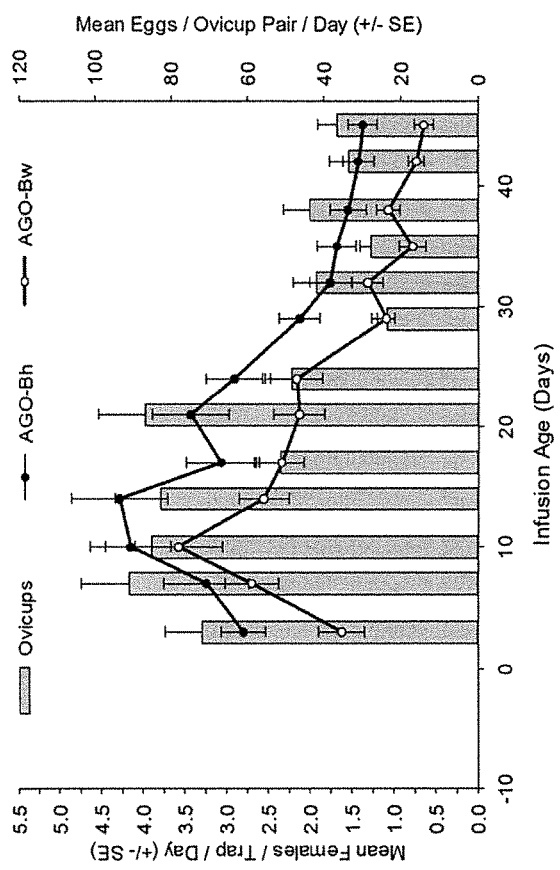
FIG. 6B illustrates improved function of an inventive ovitrap in a natural environment illustrating the average numbers of *Aedes* eggs collected in enhanced ovicups and *Aedes aegypti* adult females collected in improved autocidal gravid ovitraps baited with water (AGO-Bw) or hay infusion (AGO-Bh)

In the third field experiment (6 June to 21 July), the relative contribution of the in situ infusion to trap performance during extended use (>6 weeks) is examined by comparing adult captures in traps baited with a hay packet (AGO-Bh, AGO-Ch) and traps without a hay packet (only water; AGO-Bw, and AGO-Cw). Samples are collected from paired traps at all 30 selected properties in this experiment. Infusion-baited traps (AGO-Bh and AGO-Ch) consistently capture greater numbers of *Ae. aegypti* females than traps containing only water (FIG. 6).

Example 5: Long Term Efficacy of Adult Capture Surface

To test whether the efficacy of the adhesive is diminished after almost 9 weeks of exposure to field conditions, a 2-way competitive assay is performed under laboratory conditions (≈26° C., 70% RH, 12:12 L:D) in a 3.8×2.7×2.9 m room. In each of 4 trials, 6 of each traps type (AGO-B or AGO-C) are used; 3 with a fresh adhesive surface, and 3 with 62 day old surfaces used in the first field test. Traps are randomly assigned to 6 fixed locations forming a 2×3 m grid. One-hundred and twenty gravid *Ae. aegypti* females are released from the center of the room 3 hours prior to the start of the scotophase, and the numbers captured in each trap are determined 20 hours later. Eggs deposited on the egg collection substrate are also collected and counted. The numbers of adults and eggs collected in each trap are compared as described in Example 2 for the field cage tests. A square root transformation of the egg data is used to approximate a normal distribution.

Capture efficiency of adhesive-coated surfaces does not decline under field conditions after two months of continuous use (Table 3). The age of the adhesive surface does not significantly affect the number of adult females captured or the number of eggs collected on the egg capture substrate per captured female.

TABLE 3

|  | Capture surface age (days) | Avg. per trap (95% CI) | F | P-value |
|---|---|---|---|---|
| Adult females | 0 | 16.4 (12.6, 20.2) | 3.1 | 0.093 |
|  | 62 | 20.9 (17.1, 24.7) |  |  |
| Eggs per captured female | 0 | 15.0 (8.2, 23.8) | 0.1 | 0.799 |
|  | 62 | 13.6 (7.2, 22.1) |  |  |

Example 6: Efficacy of Various Passive Adult Vector Trap Designs

Traps are constructed using black, corrugated plastic with the inner surfaces coated with 32UVR non-setting adhesive (Atlantic Paste & Glue Co., Inc., Brooklyn, N.Y.). The traps are generally constructed of rectangular box configuration with dimensions of: height 27 cm; width 22 cm; depth 11 cm. The traps may include a central screen panel that optionally includes an attractant material. Various internal and opening configurations are tested. In each of the below experiments, traps are assayed in a 3.8 m×2.7 m×2.9 m screened room (≈26° C., 70% relative humidity). Traps are suspended 1 m above the floor. Two traps are tested per trial with a total of six trials at various treatment locations. The trap types are rotated throughout the test room for each set of experiments. Each experimental run begins with the simultaneous release of 10-14 day old gravid females, and 3-7 day old unfed males and females (40-50 per group) at 15:00 hours; collected at 09:00 hours the next day for a total collection time of 18 hrs.

Figures 7A, 7B:
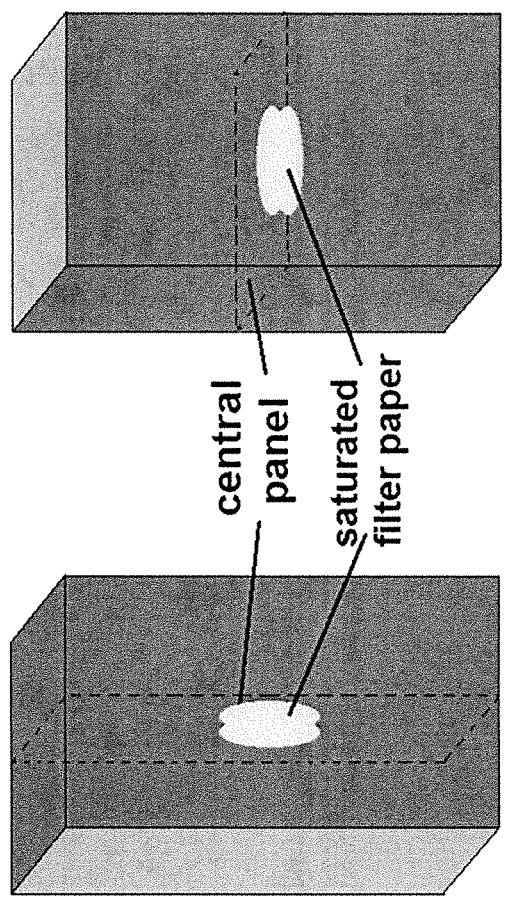
FIG. 7A is an illustration of one aspect of a passive vector trap.
FIG. 7B is an illustration of one aspect of a passive vector trap.

In a first set of experiments, traps are constructed substantially as depicted in FIG. 7 with either entrances on the side faces (A) or the top/bottom faces (B) (entrances shown in light gray, solid surfaces shown in dark gray). A central panel is provided of adhesive coated, black corrugated plastic or screen (depicted as dashed lines). Each trap includes a circular disk of filter paper saturated with water on either side of the central panel as an attractant, or the attractant is absent.

Figure 8:
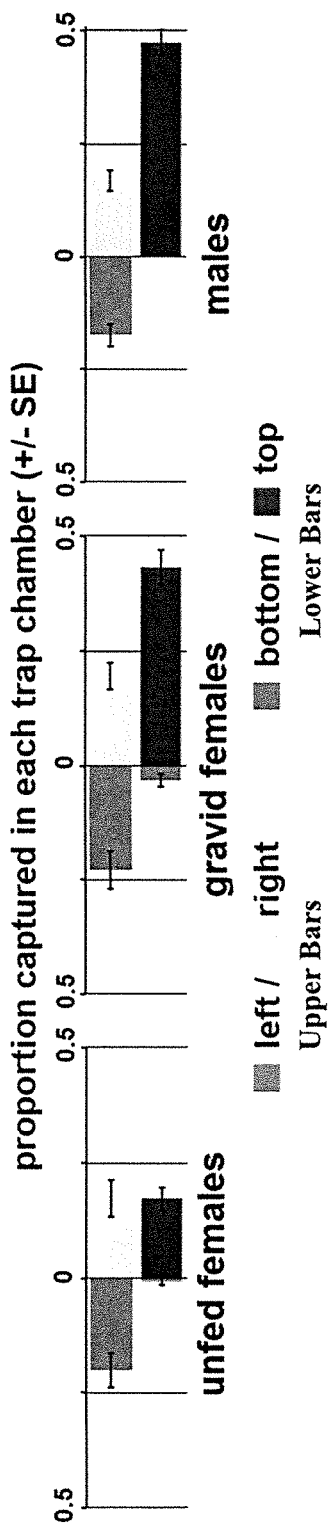
FIG. 8 illustrates the number of insect vectors captured by various passive vector trap designs.

As illustrated in FIG. 8, a significantly greater proportion of unfed females (t=3.165, p=0.034) and lower proportion of males (t=−3.078, p=0.037) are captured in the side entrance traps relative to the upper/lower entrance traps. Overall, gravid females are captured in similar numbers in both trap configurations. Also, very few vectors are captured in the bottom portion of the upper/lower entrance traps.

Figure 9:
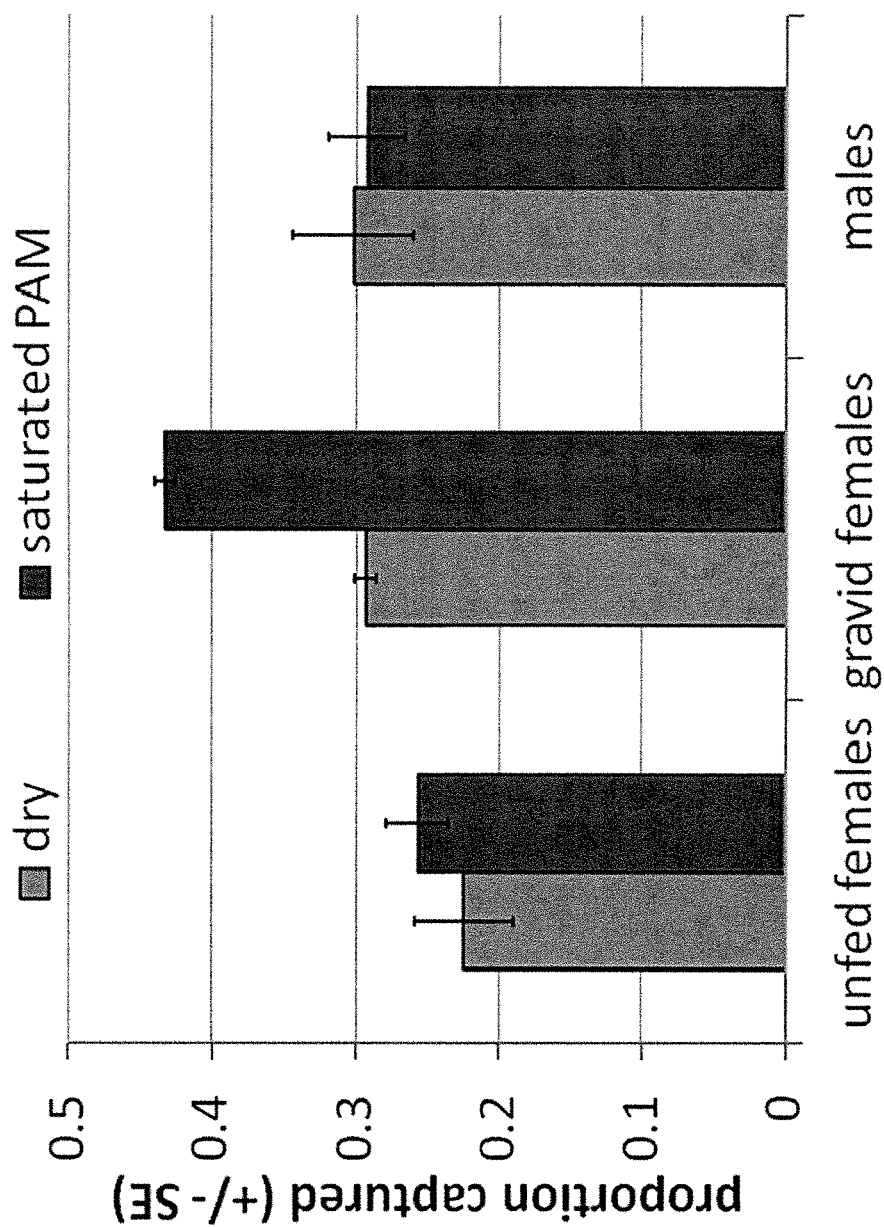
FIG. 9 illustrates improved trap performance in vector traps including a polyacrylamide hydrogel based attractant.

A second set of experiments are performed comparing the side entrance traps with no source of water vapor with side entrance traps with the water saturated filter paper replaced by a polyacrylamide hydrogel (PAM) saturated with tap water. The hydrogel has a release rate of 300 ml $H_2O$/hr. As is illustrated in FIG. 9, a significantly greater proportion of gravid females are captured in the traps baited with PAM (t=−7.573, p<0.001), compared with traps lacking a source of water vapor.

Figure 10:
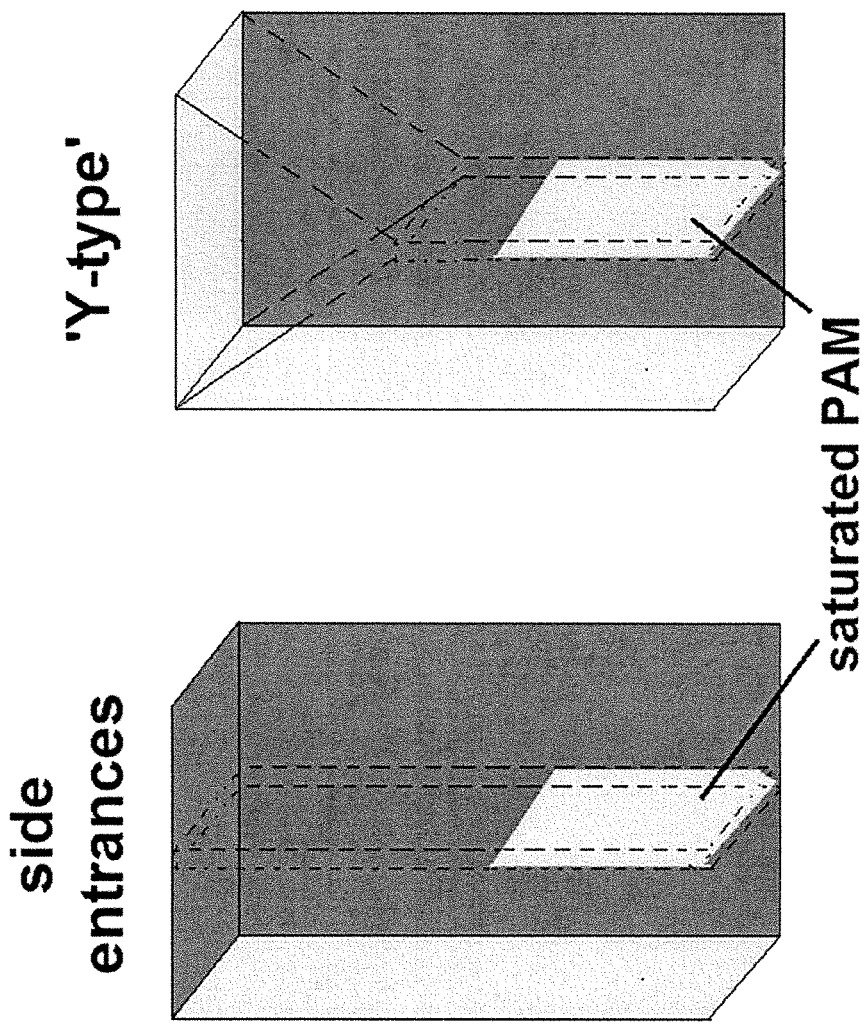
FIG. 10 is an illustration of two aspects of a passive vector trap.
Figure 11:
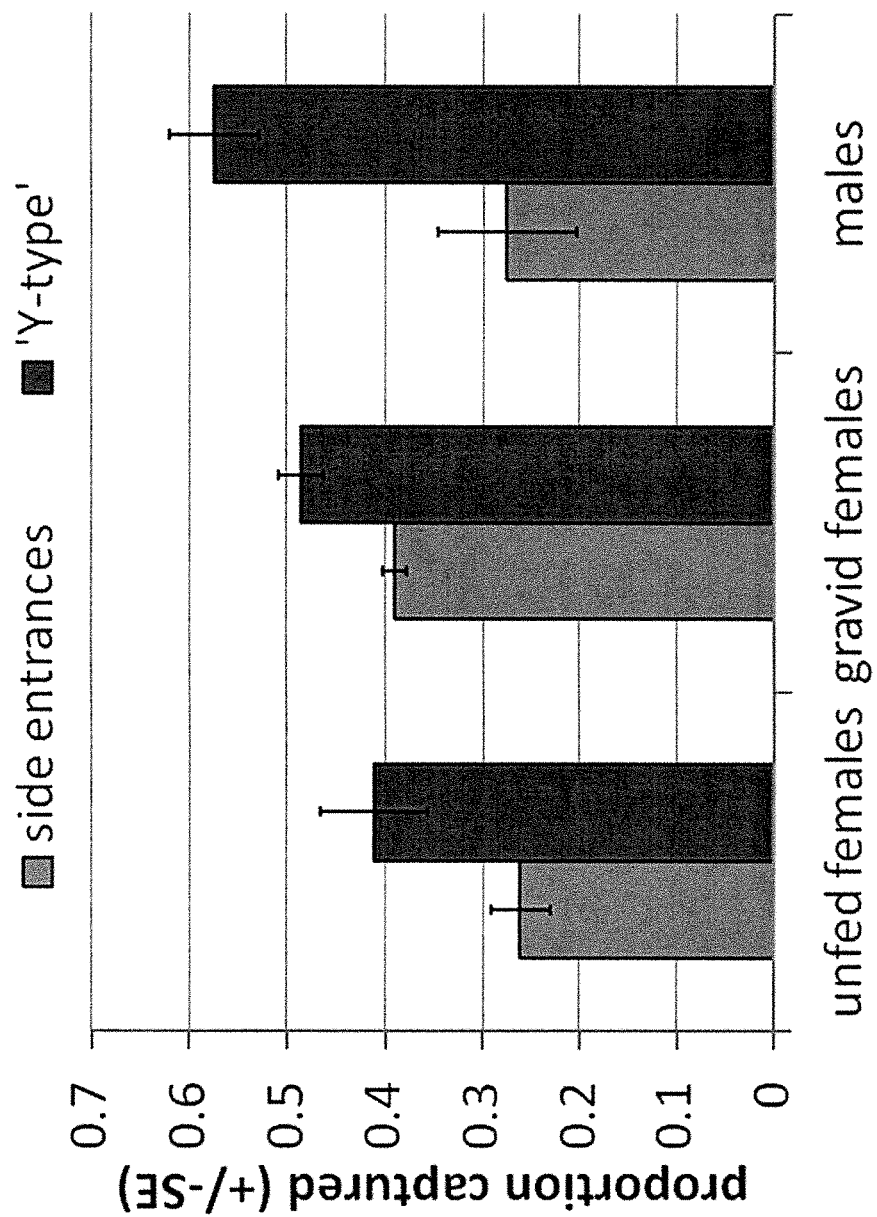
FIG. 11 illustrates the performance of the two passive vector trap configurations of FIG. 10.

In a third set of experiments, additional trap entrance designs are assembled as in FIG. 10 with either a side/side entrance configuration and a vertical panel, or a Y-entrance configuration which has an upper entrance and two side entrances with the central plastic panels in a Y-configuration. Each of the traps includes a PAM attractant saturated with tap water as an attractant material. The traps are tested as above. As is observed in FIG. 11, the Y-type configuration trap captured a significantly greater proportion of gravid females (t=−3.573, p=0.023), while a marginally significant difference in proportion of empty females (p=0.061) and males (p=0.060) are captured in the Y-type configuration.

Example 7: Efficacy of Upper Entrance Passive Adult Trap Configurations

Figure 12:
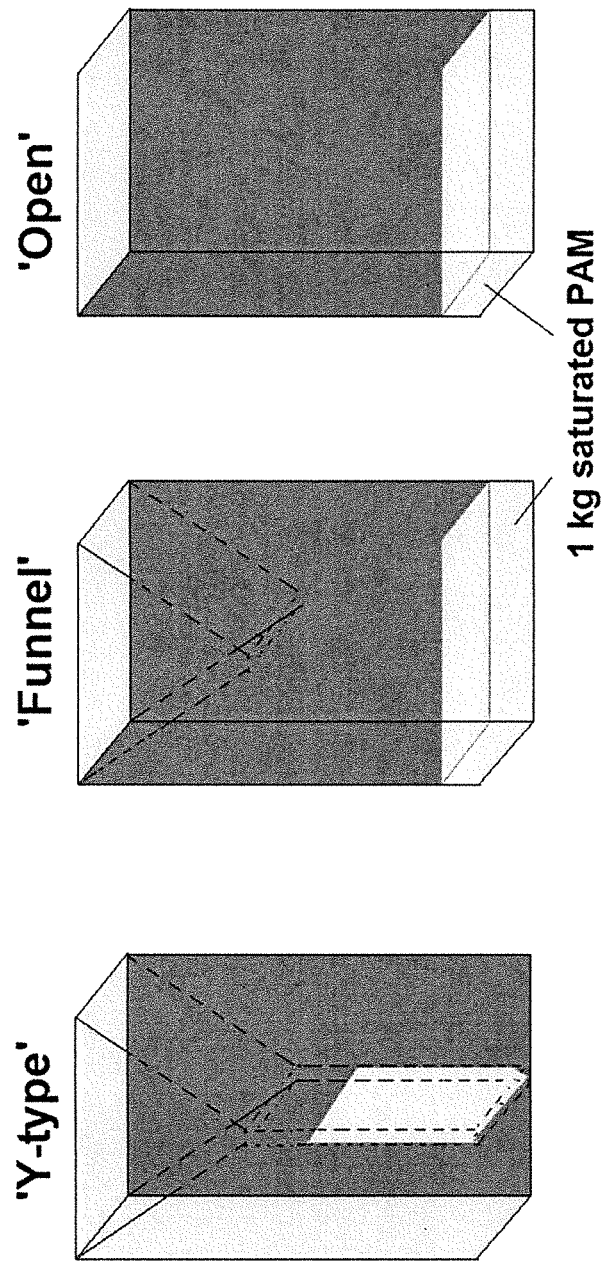
FIG. 12. is an illustration of three aspects of a passive vector trap.

Additional traps of the same materials and the same dimensions as the traps of Example 6 are constructed with either a Y-type configuration, or a set of traps with an upper entrance only either as funnel opening configuration or as an open configuration. The PAM material used as an attractant in the bottom of the trap. The trap configurations are depicted in FIG. 12. Inner, adhesive coated, black plastic panels are depicted in the Y-type and the funnel type configurations as dashed lines.

Figure 13:
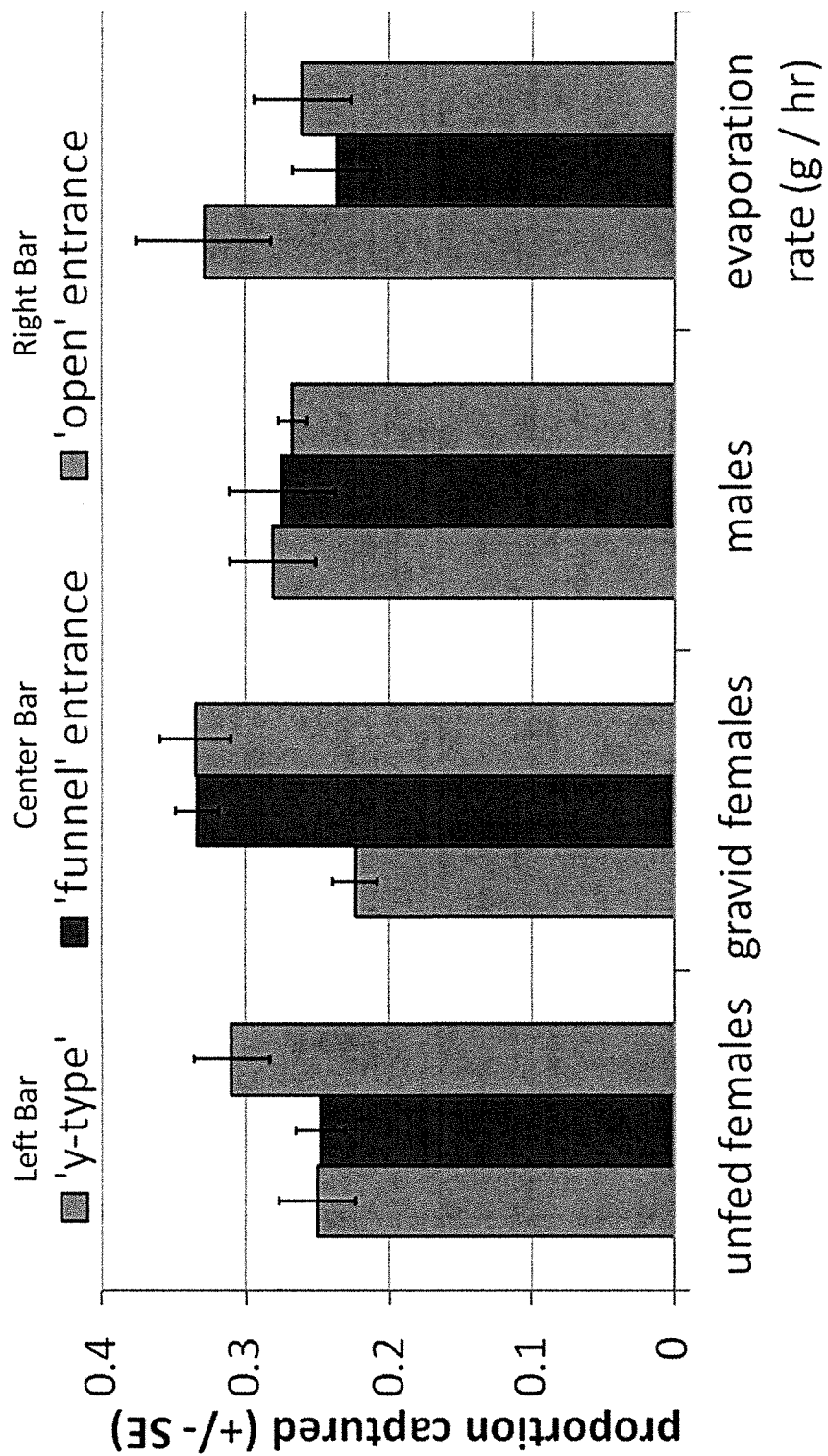
FIG. 13 illustrates the performance of the three passive vector trap configurations of FIG. 12.

The various trap configurations are tested for ability to trap mosquito vectors in a 10 m diameter geodesic dome tent using 3 traps per trial with traps placed at ground level with a minimum inter-trap distance of 4.8 m and 6 trials per experiment. One hundred mosquitoes per group are released from the center of the tent 2.5 hrs prior to sunset. The trapped insects are collected 2.5 hrs after sunrise the next day, counted, and divided into unfed females, gravid females, or males. The evaporation rate of the PAM material is also measured by weighing the trap before and after the capture time. As is illustrated in FIG. 13, a significantly smaller proportion of gravid females are captured in Y-type configuration trap (F=11.577, p=0.001) relative to the funnel or the open configurations.

Example 8: Addition of Olfactory Attractant

Figure 14A:
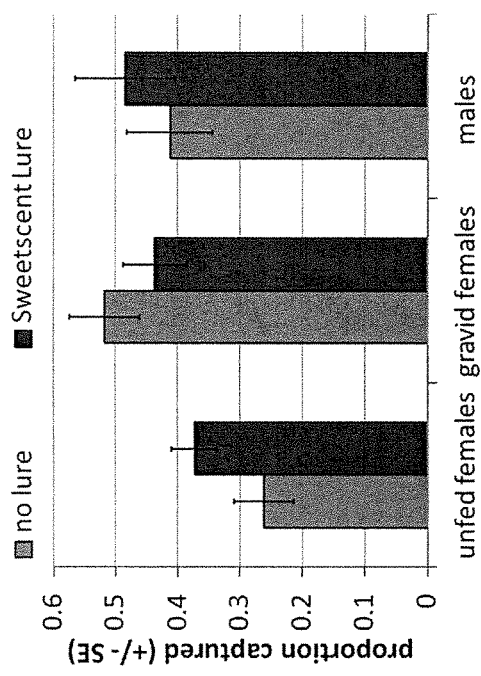
FIG. 14A illustrates the effects of traps baited with human skin based olfactory bait on vector trap performance.
Figure 14B:
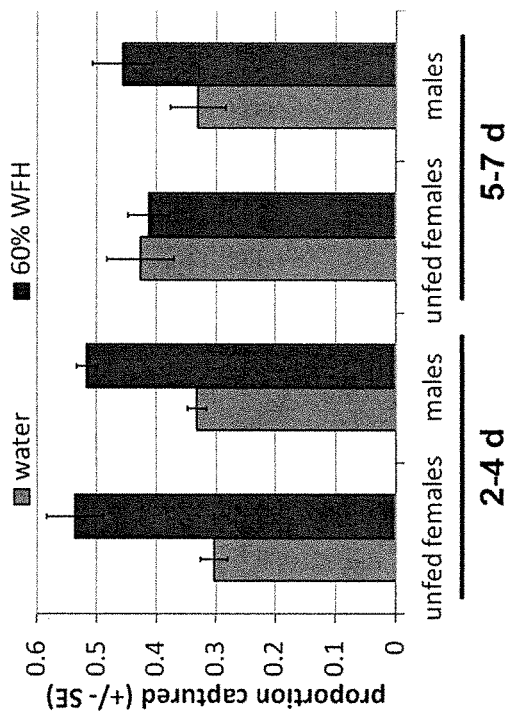
FIG. 14B illustrates the effects of traps baited with wildflower honey on vector trap performance.

Two experiments are performed in the laboratory, as in Example 6, to study the ability of an olfactory attractant to improve capture of vectors. The Y-type configuration traps of Examples 6 and 7 are baited with either: SWEETSCENT bait (Biogents GmbH, Regensburg, Germany) that represents materials found in the human skin including a mixture of ammonia, lactic acid, and fatty acid; or a sham (dry filter paper) suspended below the center of the trap entrance. The human skin scent lure slightly increases capture of unfed females (t=−5.134, p=0.004) relative to water alone (FIG. 14A). A second experiment is performed using the open configuration trap of Example 7 baited with a cotton wick saturated with a 60% dilution of unpasteurized wildflower honey (WFH) or tap water (control) suspended below the trap entrance. The honey odor (WFH) significantly enhances collection of younger (2-4 days old) females (t=−4.165, p=0.009) and males (t=−6.586, p=0.001), but show no effect on older mosquitoes (FIG. 14B).

Example 9: Effects of Trap Placement Height

Figure 15:
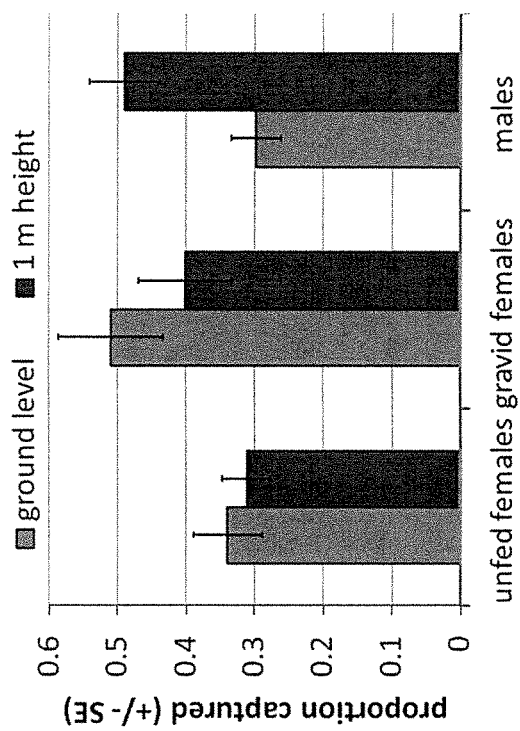
FIG. 15 illustrates the effects of vertical trap placement on vector trap performance.

The open configuration trap of Example 7 baited only with PAM as an attractant is used to study the effects of placing a trap at ground level or suspended 1 meter above the floor of the test area. Experimental parameters of Example 6 are used. As is observed in FIG. 15, a significantly greater proportion of males are captured in traps elevated 1 m above the floor relative to traps positioned on the floor (t=−3.596, p=0.016). Collection of female vectors is not significantly effected by trap placement height.

Example 10: Effects of a Visually Competitive Background

Figure 16:
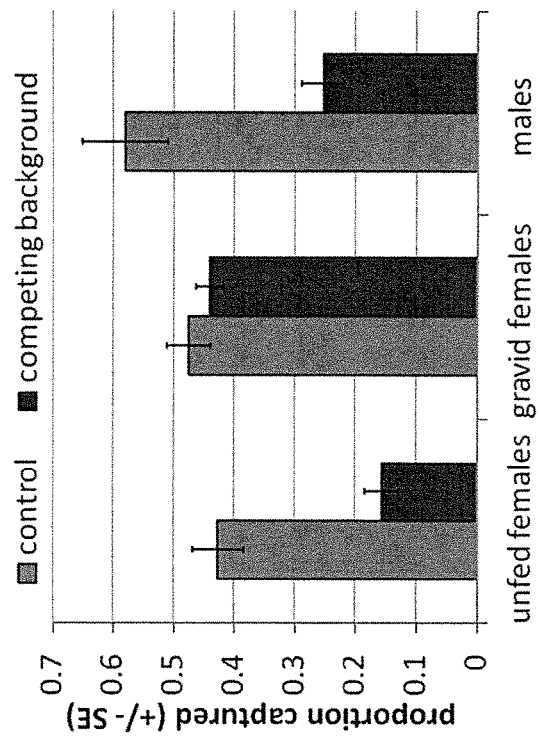
FIG. 16 illustrates the effects of shade competing backgrounds on vector trap performance.

The open configuration trap of Example 7 baited only with PAM as an attractant is used to study the effects of shade competitive backgrounds using the testing methodology described in Example 6. One trap is placed against a panel of 27 cm wide by 74 cm high that is the same black color of the trap capture chambers themselves, and a second trap is positioned without a panel (control). As is illustrated in FIG. 16, the presence of a shade competing background significantly reduces capture of unfed females (t=−4.538, p=0.006) and males (t=−3.133, p=0.026).

Various modifications of the present invention, in addition to those shown and described herein, will be apparent to those skilled in the art of the above description. Such modifications are also intended to fall within the scope of the appended claims.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular aspects of the invention, but is not meant to be a limitation upon the practice thereof. The following claims, including all equivalents thereof, are intended to define the scope of the invention.

The invention claimed is:

1. A passive autocidal ovitrap comprising:
   an attractant chamber, the attractant chamber having (i) a wall surrounding an interior volume, wherein one or more drain passages traverse the wall, the one or more drain passages allowing fluid to pass therethrough, (ii) a lower end, and, (iii) an upper end with a lid;
   a capture chamber having a trap entrance at an upper end thereof and a screen barrier at least partially traversing a lower end thereof, the trap entrance comprising a screen traversing the trap entrance and at least partially open such that an entire mature insect can pass through the trap entrance screen, the screen barrier comprising holes that are sufficiently small that mature or maturing insects are unable to cross, the capture chamber associated with the attractant chamber within the lid and positioned within a portion of the interior volume; wherein along an axis defined by the upper end and lower end of the attractant chamber, the lower end of the capture chamber is positioned closer to the upper end of the attractant chamber than the one or more drain passages; and
   the capture chamber further comprising a capture substrate.

2. The passive autocidal ovitrap of claim 1 wherein the capture chamber is in the shape of a rectangular parallelepiped.

3. The passive autocidal ovitrap of claim 1 further comprising an olfactory bait, the olfactory bait proximal to the entrance.

4. The passive autocidal ovitrap of claim 3 wherein the olfactory bait is coated on an inner surface of the capture chamber.

5. The passive autocidal ovitrap of claim 1 wherein the capture chamber is black.

6. The passive autocidal ovitrap of claim 1, wherein the capture chamber comprises the capture substrate on an inner surface of the capture chamber, and wherein the capture substrate is an adhesive.

7. A process of monitoring an insect vector in an environmental area comprising;
   placing the autocidal ovitrap of claim 1 in an environmental area; and detecting the presence or absence of an insect vector in the environmental area.

8. The process of claim 7 wherein the environmental area is an indoor environmental area.

9. The process of claim 8 wherein a plurality of said vector trap is placed in an area at a density of greater than one per environmental area.

10. The process of claim 8 wherein said vector trap is placed with one or more additional vector traps at a density of at least two per environmental area.

11. The process of claim 7 wherein said vector trap is not serviced for greater than 20 days.

\* \* \* \* \*